US007425967B2

(12) United States Patent
Jeong

(10) Patent No.: US 7,425,967 B2
(45) Date of Patent: Sep. 16, 2008

(54) DEVICE FOR PROCESSING PIXEL RASTERIZATION AND METHOD FOR PROCESSING THE SAME

(75) Inventor: Jong Chul Jeong, Seoul (KR)

(73) Assignee: Core Logic Inc., Seoul (KR)

( * ) Notice: Subject to any disclaimer, the term of this patent is extended or adjusted under 35 U.S.C. 154(b) by 379 days.

(21) Appl. No.: 11/213,919

(22) Filed: Aug. 30, 2005

(65) Prior Publication Data

US 2006/0284883 A1    Dec. 21, 2006

(30) Foreign Application Priority Data

Jun. 16, 2005    (KR) .................... 10-2005-0051800

(51) Int. Cl.
*G09G 5/00* (2006.01)
*G06T 15/40* (2006.01)
*G06T 1/20* (2006.01)
*G06F 15/80* (2006.01)

(52) U.S. Cl. .................. 345/614; 345/613; 345/422; 345/505; 345/506

(58) Field of Classification Search .......... 345/422, 345/613, 614, 505, 506
See application file for complete search history.

(56) References Cited

U.S. PATENT DOCUMENTS 7,170,515 B1 *    1/2007    Zhu ........................... 345/422

* cited by examiner

*Primary Examiner*—Kee M. Tung
*Assistant Examiner*—Hau H Nguyen
(74) *Attorney, Agent, or Firm*—Foley & Lardner LLP

(57) ABSTRACT

The present invention relates to a device and method for processing pixel rasterization in 3-Dimensional graphic engine. According to an embodiment of the present invention, a method of processing pixel rasterizaton in 3-Dimensional graphic engine comprises the steps of: receiving a plurality of fragment informations; verifying whether the coordinate of the fragment informations are adjacent to X axis or not; detecting depth values of old fragment; comparing the depth values of the old fragment; storing depth values of the newly inputted fragment after comparison; and storing color values, which are performed alpha blending, in a color cache. The apparatus for pixel rasterization processing in 3-Dimensional graphic engine includes a depth readout unit, a depth test unit, a depth entry unit, a color readout unit, an alpha blending unit, a color entry unit, a depth cache, a color cache and a frame memory.

9 Claims, 4 Drawing Sheets

DEVICE FOR PROCESSING PIXEL RASTERIZATION AND METHOD FOR PROCESSING THE SAME

This Nonprovisional application claims priority under 35 U.S.C. § 119(a) on patent application No. 10-2005-0051800 filed in Republic of Korea on Jun. 16, 2005, the entire contents of which are hereby incorporated by reference.

BACKGROUND OF THE INVENTION

1. Field of the Invention

The present invention relates to a device for processing pixel rasterization in 3-Dimensional graphic engine and method for processing the same, and more specifically to a device and method for processing pixel rasterization in 3-Dimensional graphic engine capable of performing 3-Dimensional graphic processing efficiently using multiple pipelines with a single cache.

2. Description of the Background Art

3-Dimensional (3-D, hereinafter) graphic technology can display an image of an object in 3-D space using 3 axes of height, width, and depth, which can realistically display the image in a 2-Dimensional monitor.

The 3-D graphic engine inputs a geometrical image described by an image modeler, and uses parameters such as camera viewing or illumination to generate an image.

The 3-D graphic engine performs a series of processing steps called a "graphic pipeline". Any delay in processing in the graphic pipeline will affect pipeline processing speed.

Processing in the graphic pipeline is divided into geometry processing and rendering processing. The quantity of calculation in geometry processing is proportional to the number of a definite point of polygon, and the quantity of calculation in rendering processing is proportional to the number of pixel of image.

When the graphic processing is performed in a high resolution monitor, the processing speed of the rendering engine, which performs rendering processing, needs to be increased as the number of picture element increases. To solve the above described speed problem, the inner structure could be reorganized, or the parallel method of increasing the number of rendering engine could be considered.

To increase the processing speed of a rendering engine, access to memory is most important. In other words, increasing the bandwidth of memory promotes access to memory. Texture data and pixel data processing should be performed to display an image in 2D screen, and such data are stored in memory. Equipping cache memory in graphic engine is essential to decrease access time to memory.

Conventional processing method of pixel rasterization has a drawback in that an additional device is needed to maintain consistency between cache memories by using one pipeline per one cache memory and that processing speed of pixel raterization is delayed.

SUMMARY OF THE INVENTION

Accordingly, an object of the present invention is to solve at least the above noted problems and other problems and disadvantages of the background art.

It is another object of the present invention to provide a device and method for processing pixel rasterization in 3-Dimensional graphic engine capable of performing 3-Dimensional graphic processing efficiently using multiple pipeline in a cache.

According to an embodiment of the present invention, a method of processing pixel rasterizaton in 3-Dimensional graphic engine comprises the steps of: (a) receiving a plurality of newly inputted fragment informations; (b) checking whether the coordinate of the plurality of newly inputted fragment informations are adjacent to X axis or not; (c) detecting depth values of a plurality of old fragments having the same coordinate value as the coordinate of the plurality of adjacent fragment informations from depth cache when the coordinate of the plurality of newly inputted fragment informations are adjacent to X axis; (d) comparing the depth values of newly inputted fragments with the depth values of the old fragments respectively; (e) storing depth values of the plurality of newly inputted fragments in the depth cache respectively when the depth value of the newly inputted fragment is less than the depth value of the old fragment; and (f) performing an alpha blending on the color values of the old fragments and color values of the plurality of newly inputted fragments, after reading out color values of the old fragments from the color cache, and storing color values, which are alpha blended, into a color cache.

According to an embodiment of the present invention, a device for processing pixel rasterization in 3D graphic engine comprises: a depth readout unit that detects old fragment informations having the same coordinate value as the coordinate of a plurality of newly inputted fragment informations, after receiving the newly inputted fragment informations; a depth cache that provides the depth readout unit with the old fragment informations having the same coordinate value as the coordinate of the new fragment informations; a depth test unit that compares a depth value of the newly inputted fragment with a depth value of the old fragment; a depth entry unit that stores the depth value of the newly inputted fragment into the depth cache when the depth value of the newly inputted fragment is less than the depth value of the old fragment after comparing the depth values; a color read out unit that reads out the color value of the old fragment; an alpha blending unit that performs alpha blending on the color value of the old fragment and on the color value of the newly inputted fragment; a color cache that provides the color value of the old fragment to the color read out unit and stores the color value which is alpha blended; a color entry unit that stores the alpha-blended color value into the color cache; and a frame memory that provides a corresponding fragment information to the depth readout unit when the corresponding fragment information does not exist in the depth cache, wherein the depth cache stores the depth value of the newly inputted fragment when the depth value of the newly inputted fragment is less than the depth value of the old fragment.

According to an embodiment of the present invention, the number of the newly inputted fragment informations range from 2 to 8.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

Figure 1:
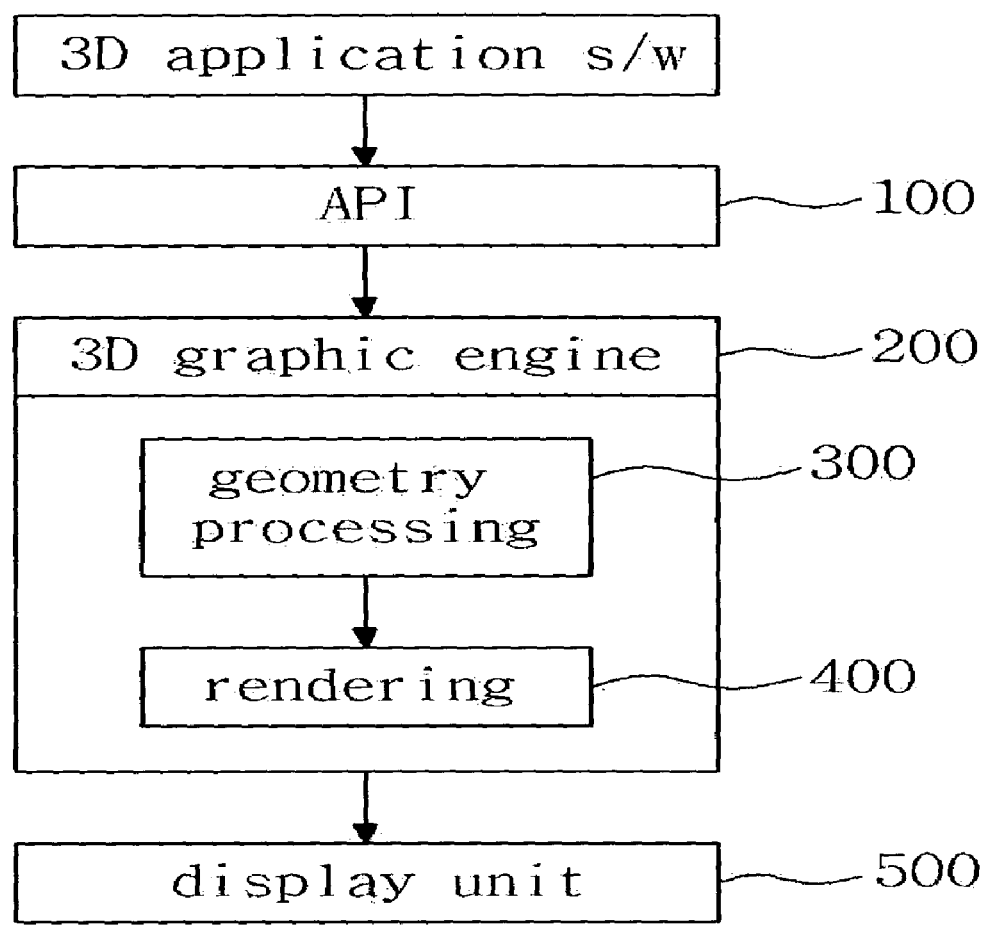
FIG. 1 is a block diagram illustrating 3-Dimensional graphic processing according to an embodiment of the present invention.

Preferred embodiments of the present invention will be described in a more detailed manner with reference to the drawings.

According to an embodiment of the present invention, a method of processing pixel rasterizaton in 3-Dimensional graphic engine comprises the steps of: (a) receiving a plurality of newly inputted fragment informations; (b) checking whether the coordinate of the plurality of newly inputted fragment informations are adjacent to the X axis or not; (c) detecting the depth values of a plurality of old fragments having the same coordinate value as the coordinate of the plurality of adjacent fragment informations from the depth cache when the coordinate of the plurality of newly inputted fragment informations are adjacent to the X axis; (d) comparing the depth values of the newly inputted fragment with the depth values of the old fragment respectively; (e) storing the depth values of the plurality of the newly inputted fragments in the depth cache respectively when the depth value of the newly inputted fragment is less than the depth value of the old fragment; and (f) respectively performing an alpha blending on the color values of the old fragments and color values of the plurality of newly inputted fragments, after respectively reading out color values of the old fragments from the color cache, and respectively storing color values, which are alpha blended, into a color cache.

According to an embodiment of the present invention, in step (c), corresponding fragment informations are detected from a frame memory, wherein the corresponding fragment informations do not exist in the depth cache.

According to an embodiment of the present invention, in step (e), the newly inputted fragment information is deleted when the depth value of the newly inputted fragment is greater than the depth value of the old fragment.

According to an embodiment of the present invention, if the coordinates of the plurality of newly inputted fragment informations are not adjacent to the X axis, comprises the steps of: (g) detecting the depth value of the old fragment having the same coordinate value as the coordinate of the fragment information, which is newly inputted and not adjacent to the X axis, from depth cache; (h) comparing the depth value of the newly inputted fragment with the depth value of the old fragment; (i) storing the depth value of the newly inputted fragment in the depth cache when the depth value of the newly inputted fragment is less than the depth value of the old fragment; (j) performing the alpha blending on the color values of the old fragments and color values of the newly inputted fragments, after reading out color values of the old fragments from the color cache, and storing color values, which are alpha blended, into the color cache.

According to an embodiment of the present invention, in step (g), the corresponding fragment information is detected from the frame memory, when the corresponding fragment information does not exist in the depth cache.

According to an embodiment of the present invention, in step (i), wherein the newly inputted fragment information is discarded into the pipeline when the depth value of the newly inputted fragment is greater than the depth value of the old fragment.

According to an embodiment of the present invention, the number of the newly inputted fragment informations range from 2 to 8.

According to an embodiment of the present invention, a device for processing pixel rasterization in 3D graphic engine comprises: a depth readout unit that detects the old fragment informations having the same coordinate value as the coordinate of a plurality of newly inputted fragment informations, after receiving the newly inputted fragment informations; a depth cache that provides the depth readout unit with the old fragment informations having the same coordinate value as the coordinate of the new fragment informations; a depth test unit that compares a depth value of the newly inputted fragment with a depth value of the old fragment; a depth entry unit that stores the depth value of the newly inputted fragment into the depth cache when the depth value of the newly inputted fragment is less than the depth value of the old fragment after comparing the depth values; a color read out unit that reads out color value of the old fragment; an alpha blending unit that performs alpha blending on the color value of the old fragment and the color value of the newly inputted fragment; a color cache that provides the color value of the old fragment to the color read out unit and stores the color value which is alpha blended; a color entry unit that stores the alpha-blended color value into the color cache; and a frame memory that provides a corresponding fragment information to the depth readout unit when the corresponding fragment information does not exist in the depth cache, wherein the depth cache stores the depth value of the newly inputted fragment when the depth value of the newly inputted fragment is less than the depth value of the old fragment.

According to an embodiment of the present invention, the number of newly inputted fragment information range from 2 to 8.

Referring to FIG. 1, according to an embodiment of the present invention, 3-Dimensional graphic processing will be explained.

FIG. 1 is a block diagram illustrating 3-Dimensional graphic processing according to an embodiment of the present invention.

3-Dimensional graphic processing according to an embodiment of the present invention includes steps of: transmitting 3-Dimensional graphic data by 3-Dimensional application software through an application program interface (API) 100; performing real time hardware acceleration by 3-Dimensional graphic engine 200 on 3-Dimensional graphic data from API 100; and transmitting the data to a display unit 500

3-Dimensional graphic engine 200 principally performs geometry processing 300 and rendering processing 400. In geometry processing 300, the object of the 3-Dimensional coordinate system is transformed depending on the view point, being processed to perform the projection to a 2-Dimensional coordinate system.

Rendering processing 400 is a process of determining color value on an image of the 2-Dimensional coordinate system, and storing the value into a frame memory 52. Color value stored in the frame memory 52 is transmitted to display unit 500, after completing the performance of processing on all 3-Dimensional data inputted on a frame.

Figure 2:
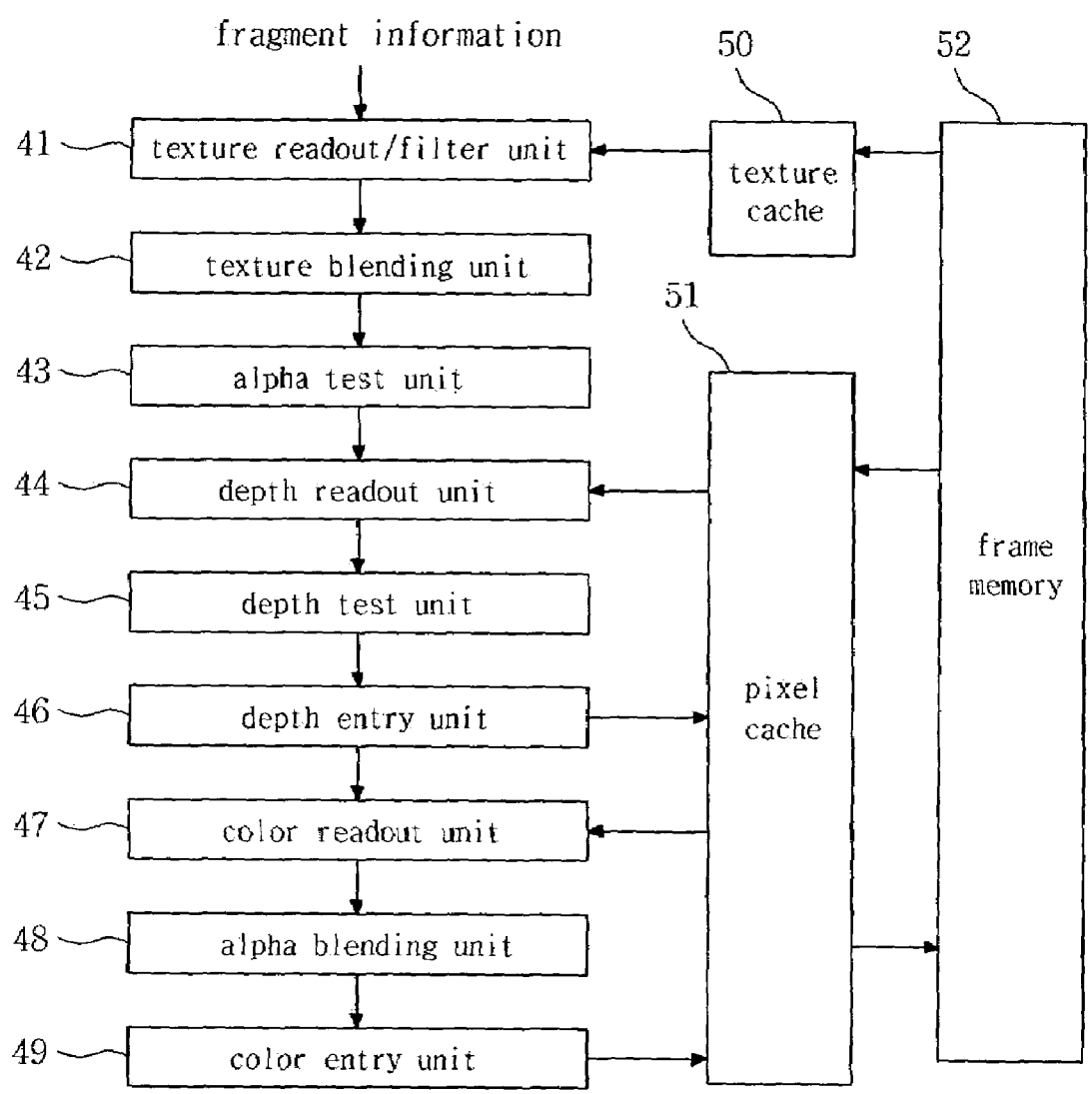
FIG. 2 is a block diagram illustrating a pixel rasterization pipeline according to an embodiment of the present invention.

FIG. 2 is a block diagram illustrating a pixel rasterization pipeline according to an embodiment of the present invention;

Referring FIG. 2, an input fragment information includes color value generated by interpolation, 3-Dimensional position coordinate (x, y, z), and texture coordinate.

In this case, a texture read out/filter unit (41) read outs 4 or 8 texel from a texture cache 50 through texture coordinate of the input fragment information and performs filtering, in order to generate one filtered texel when the texel represents a minimum unit of texture data.

A texture blending unit 42 defines a color by blending the one filtered texel generated with color values of multiple texels which are read out from the texture cache 50.

An alpha test unit 43, then, examines transparency that is an alpha value of a fragment which depends on the newly inputted texel.

In a depth read out unit 44 and a depth test unit 45, the depth value of a present position fragment is read out from pixel cache 51, and the depth value of fragment that is read out and the depth value of the fragment that is newly inputted are compared. If the depth value of newly inputted fragment is less than the depth value of the present fragment, the depth value of the newly inputted fragment is stored in pixel cache 51.

If the depth value of the newly inputted fragment is greater than the depth value of the present fragment, the newly inputted fragment is discarded into the pipeline.

A color readout unit 47 reads out the color value from the pixel cache 51, and an alpha blending unit 48 performs alpha blending on color value that is read out from the pixel cache 51 and color value that is blended in the texture blending unit 42.

Finally, a color entry unit 49 stores the color value which is acquired by performing alpha blending in the alpha blending unit 48 into the pixel cache 51.

Such rasterization processing on most quantity of total memory transmission is performed in the step of pixel processing pipeline for the transmission of texture data, the transmission of the depth value and the color value, and access to the frame memory 52. Delay in frame memory access and bandwidth of memory play a significant role in performance. The present invention suggests the operation of processing pixel rasterization, hence, hereinafter, only the operation of processing pixel rasterization will be described.

Figure 3:
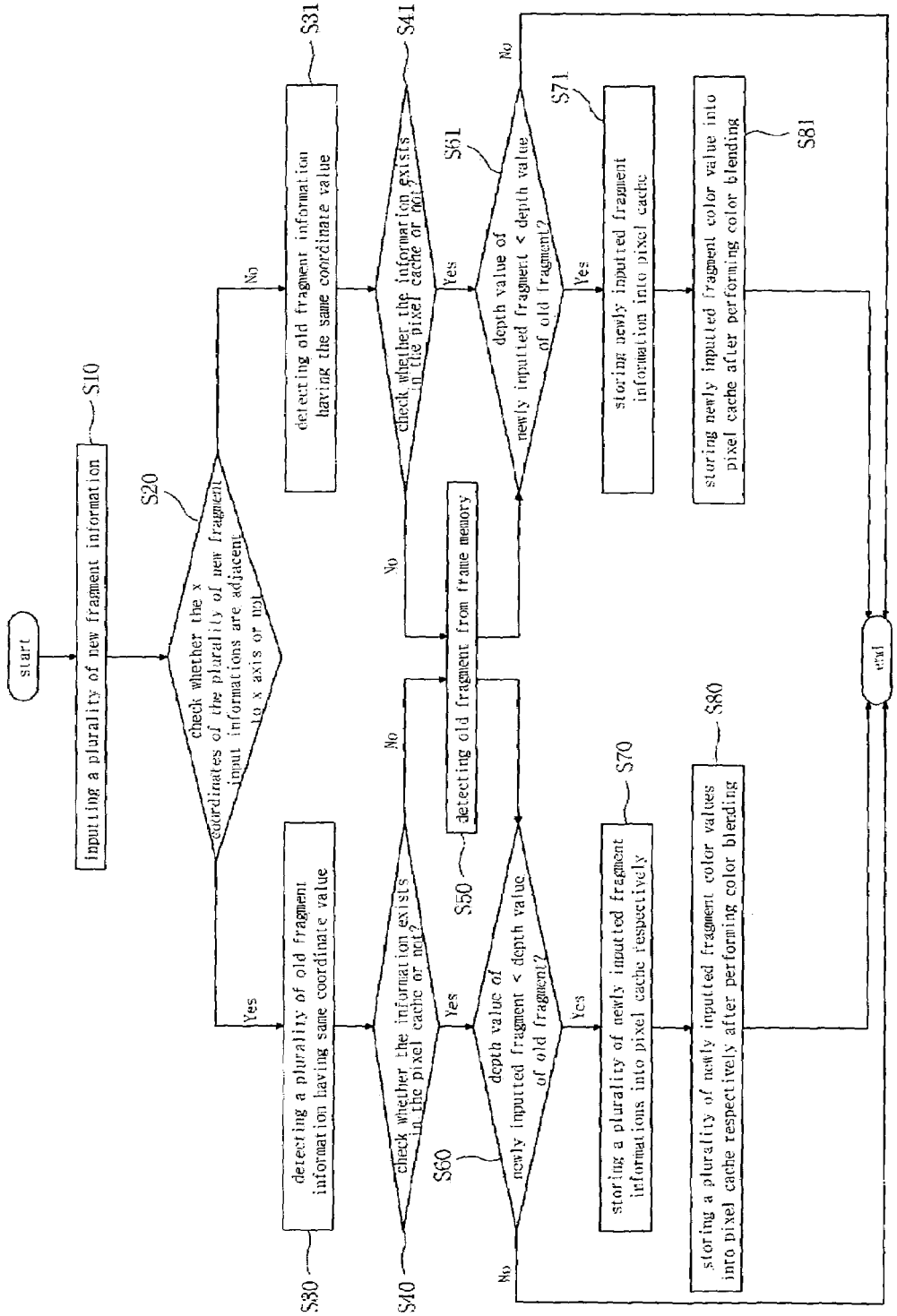
FIG. 3 is a flow chart illustrating a method of processing pixel rasterization according to an embodiment of the present invention.

Referring FIG. 3, the method of processing pixel rasterization according to an embodiment of the present invention would be described. FIG. 3 is a flow chart representing the method of processing pixel rasterization according to an embodiment of the present invention.

First, a plurality of new informations are inputted to S10. In this case, the fragment information inputs include color value generated by interpolation, the 3Dimensional position coordinates (x, y, z) and the texture coordinates.

A check is made as to whether the x coordinates of the plurality of newly inputted fragment informations are adjacent to the x axis S20. When pixels are generated in a triangle set up processing, they are generated, in a line base, within a line. Hence, the reason for such checking is that the possibility of sequential pixel generating adjacent to the x axis is high.

For example, when the x coordinate of a first pipeline is (1, 1), the x coordinate of a second, a third, and a fourth pipeline is (2, 1), (3, 1), (4, 1) respectively. Each coordinate could be acquired by adding $\Delta 1$, $\Delta 2$, $\Delta 3$ to the x coordinate of the first pipeline. Accordingly, rasterization processing is performed simultaneously for fragment informations adjacent to the x coordinate.

It is preferable that the number of the newly inputted fragment informations range from 2 to 8.

A texture read out/filter unit 410 generates one texel by performing filtering, after reading out 4 or 8 textel from a texture cache 401 through texture coordinate of the newly inputted fragment information. The texel means a minimum unit of texture data.

A texture blending unit 420 defines a color by blending the one generated texel with the color values of multiple texels read out from the texture cache 401.

An alpha test unit 430, then, examines the transparency that is an alpha value of a fragment according to the newly inputted texel.

A depth read out unit 440 detects depth values of a plurality of old fragments, having the same coordinate value as the coordinate of a plurality of fragment informations adjacent to x coordinate, from a depth cache 403, when the coordinates of the plurality of the newly inputted fragment informations are adjacent to the x coordinate.

In this case, the depth read out unit 440 checks whether the depth value of multiple old fragments having the same coordinate value as the coordinate of the plurality of fragment informations adjacent to the x coordinate exist in the depth cache 403 S40. Then, if the informations of the corresponding fragments do not exist in the depth cache 403, the informations of corresponding fragments are detected from the frame memory 405 S50.

A depth test unit 450 compares the depth values of the inputted fragment with the depth values of the old fragment respectively S60.

If the depth value of the newly inputted fragment is less than the depth value of the old fragment, a depth entry unit 460 stores the depth values of the plurality of the newly inputted fragment into the depth cache 403 respectively S70.

If the depth value of the newly inputted fragment is greater than the depth value of the old fragment, the information of the newly inputted fragment is discarded.

A color read out unit 470 reads the color values of the old fragment from a color cache 404. An alpha blending unit 480 performs alpha blending on the color values of the old fragments that are read from the color cache 404 and the color valus of the plurality of the newly inputted fragments. Finally, a color entry unit 490 stores the color values that are alpha blended in the alpha blending unit 480 into the color cache 404.

The present invention creates only one standard address through performing rasterization processing simultaneously on multiple fragment informations which are adjacent to the x axis. Accordingly, it is possible to perform rasterization processing of multiple fragment informations with only one cache system. Also, an additional system is not required to maintain data consistency.

A check is made as to whether the x coordinates of the plurality of newly inputted fragment informations are adjacent to the x axis or not S20. If coordinates of the plurality of newly inputted fragment informations are not adjacent to the x axis, the above step S30~S80 is performed with only the newly inputted fragment information which is not adjacent to the x axis.

Figure 4:
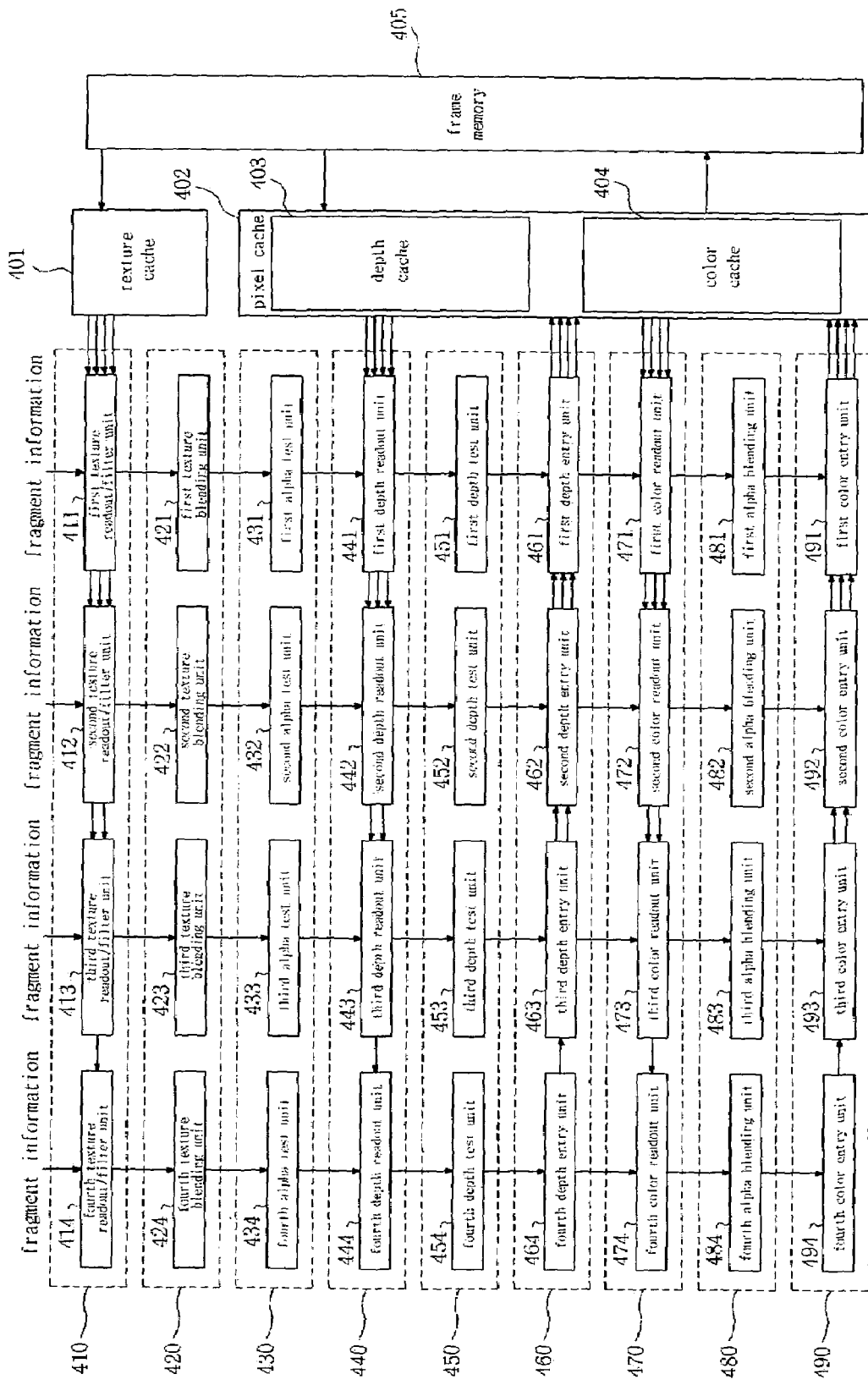
FIG. 4 is a block diagram illustrating a pixel rasterization pipeline according to an embodiment of the present invention.

Referring FIG. 4, an apparatus for pixel rasterization processing according to an embodiment of the present invention will be explained. FIG. 4 is a block diagram illustrating a pixel rasterization pipeline according to an embodiment of the present invention.

The apparatus for pixel rasterization processing according to an embodiment of the present invention includes a depth readout unit 440, a depth test unit 450, a depth entry unit 460, a color readout unit 470, an alpha blending unit 480, a color entry unit 490, a depth cache 402, a color cache 404 and a frame memory 405.

The depth readout unit 440 includes a plurality of depth readout units 441~444 as many as the number of newly inputted fragment informations. After the newly inputted fragment informations are inputted in the depth readout unit 440, the depth readout unit 440 detects the old fragment informations having the same coordinate value as the coordinate of the plurality of the fragment input informations.

The depth test unit 450 includes a plurality of depth test units 451~454 as many as the number of newly inputted fragment informations. The depth test unit 450 compares the depth value of the newly inputted fragments with the depth value of the old fragments.

The depth entry unit 460 includes a plurality of depth entry units 461~464 as many as the number of newly inputted fragment informations. The depth entry unit 460 compares the depth value of the newly inputted fragment with the depth value of the old fragment. The depth value of the newly inputted fragment is stored in the depth cache, only when the depth value of the newly inputted fragment is less than the depth value of the old fragment.

The color readout unit 470 includes a plurality of color readout units 471~474 as many as the number of newly inputted fragment informations.

The alpha blending unit 480 includes a plurality of alpha blending units 481~484 as many as the number of newly inputted fragment informations. The alpha blending unit 480 performs alpha blending on the color value of the old fragment and the color value of the newly inputted fragment.

The depth cache 402 includes only one depth cache 402 regardless of the number of the newly inputted fragment informations. The depth cache 402 provides the depth readout units 441~444 with old fragment informations having the same coordinate value as the coordinate of the new fragment information respectively. If the depth value of the newly inputted fragment is less than the depth value of the old fragment, the depth cache 402 stores the depth value of the newly inputted fragment.

The color cache 404 includes only one color cache 404 regardless of the number of the newly inputted fragment informations. The color cache 404 provides the color readout units 471~474 with color values of old fragments respectively, storing alpha blended color values.

Accordingly, the present invention does not require inclusion of an additional device to maintain consistency among caches by establishing only one pixel cache 402 with multiple pipelines.

The frame memory 405 includes only one frame memory 405 regardless of the number of the newly inputted fragment informations. The frame memory 405 provides the depth readout unit 440 with corresponding fragment informations, when corresponding fragment informations do not exist in the depth cache 403.

In this case, it is preferable that the number of the newly inputted fragment informations range from 2 to 8

As described above, the device and method for processing pixel rasterization in 3-Dimensional graphic engine according to an embodiment of the present invention establishes multiple pipelines in one pixel cache. The present invention does not require inclusion of an additional device to maintain consistency among caches by establishing only one pixel cache 402 with multiple pipelines. As a result, the speed of pixel rasterization processing may be increased as many as the number of pipelines, and the number of pixel caches which are relatively expensive may be decreased.

The invention being thus described above, may be varied in many ways. Such variations are not to be regarded as a departure from the spirit and scope of the invention, and all such modifications as would be obvious to one skilled in the art are intended to be included within the scope of the following claims.

What is claimed is:

1. A method of processing pixel rasterization in 3-Dimensional graphic engine, comprising the steps of:
   (a) receiving a plurality of newly inputted fragment information;
   (b) checking whether the coordinate of the plurality of newly inputted fragment information are adjacent to the X axis or not;
   (c) respectively detecting depth values of a plurality of old fragments having the same coordinate value as the coordinate of the plurality of adjacent fragment information from depth cache when the coordinate of the plurality of newly inputted fragment information are adjacent to the X axis;
   (d) respectively comparing the depth value of the newly inputted fragments with the depth value of the old fragments respectively;
   (e) respectively storing the depth values of the plurality of the newly inputted fragments in the depth cache respectively when the depth value of the newly inputted fragments are less than the depth values of the old fragments; and
   (f) respectively performing an alpha blending on the color values of the old fragments and color values of the plurality of newly inputted fragments, after respectively reading out color values of the old fragments from the color cache, and respectively storing color values, which are alpha blended, into a color caches,
   wherein the 3-Dimensional graphic engine uses a pixel cache and a texture cache that are coupled with a frame memory, and
   wherein the method is coincidently and individually processed by multiple pipelines that are coupled with the pixel cache and the texture cache per a plurality of newly inputted fragments.

2. The method of claim 1, in step (c), corresponding fragment information are detected from a frame memory, wherein the corresponding fragment information do not exist in the depth cache.

3. The method of claim 1, in step (e), the newly inputted fragment information is deleted when the depth value of the newly inputted fragment is greater than the depth value of the old fragment.

4. The method of claim 1, comprises the steps of:
   (g) detecting the depth value of the old fragment having the same coordinate value as the coordinate of the fragment information, which is newly inputted and not adjacent to the X axis, from depth cache;
   (h) comparing the depth value of the newly inputted fragment with the depth value of the old fragment;
   (i) storing the depth value of the newly inputted fragment in the depth cache when the depth value of the newly inputted fragment is less than the depth value of the old fragment; and
   (j) performing the alpha blending on the color values of the old fragments and color values of the newly inputted fragments, after reading out color values of the old fragments from the color cache, and storing color values, which are alpha blended, into the color cache,
   wherein if the coordinates of the plurality of newly inputted fragment information are not adjacent to the X axis.

5. The method of claim 4, in step (g), wherein the corresponding fragment information is detected from the frame memory, when the corresponding fragment information does not exist in the depth cache.

6. The method of claim 4, in step (i), wherein the newly inputted fragment information is discarded into the pipeline when the depth value of the newly inputted fragment is greater than the depth value of the old fragment.

7. The method of claim 1, the number of the newly inputted fragment information range from 2 to 8.

8. A device for processing pixel rasterization in 3D graphic engine, the device comprising:
   a depth readout unit that detects the old fragment information having the same coordinate value as the coordinate of a plurality of newly inputted fragment information, after receiving the newly inputted fragment information;
   a depth cache that provides the depth readout unit with the old fragment information having the same coordinate value as the coordinate of the new fragment information;
   a depth test unit that compares a depth value of the newly inputted fragment with a depth value of the old fragment;
   a depth entry unit that stores the depth value of the newly inputted fragment into the depth cache when the depth value of the newly inputted fragment is less than the depth value of the old fragment after comparing the depth values;
   a color readout unit that reads out a color value of the old fragment;
   an alpha blending unit that performs alpha blending on the color value of the old fragment and on the color value of the newly inputted fragment;
   a color cache that provides the color value of the old fragment to the color read out unit and stores the color value which is alpha blended;
   a color entry unit that stores the alpha-blended color value into the color cache;
   a frame memory that provides a corresponding fragment information to the depth readout unit when the corresponding fragment information does not exist in the depth cache;
   a pixel cache coupled with one frame memory; and
   a texture cache coupled with the frame memory,
   wherein the depth cache stores the depth value of the newly inputted fragment when the depth value of the newly inputted fragment is less than the depth value of the old fragments,
   wherein the device is coincidently and individually processed by multiple pipelines that are coupled with the pixel cache and the texture cache per a plurality of newly inputted fragments.

9. The method of claim 8, the number of the newly inputted fragment information range from 2 to 8.

\* \* \* \* \*